United States Patent
Chen et al.

(10) Patent No.: US 6,617,071 B2
(45) Date of Patent: Sep. 9, 2003

(54) ACTIVE MATERIAL FOR HIGH POWER AND HIGH ENERGY LEAD ACID BATTERIES AND METHOD OF MANUFACTURE

(75) Inventors: Rongrong Chen, Fishers, IN (US); Wellington Y. Kwok, Fishers, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/864,762

(22) Filed: May 24, 2001

(65) Prior Publication Data

US 2002/0177038 A1 Nov. 28, 2002

(51) Int. Cl.$^7$ .................... B23P 13/00; H01M 4/82; H01M 4/72; H01M 4/56
(52) U.S. Cl. .................. 429/212; 429/217; 429/227; 429/233; 429/236; 429/245; 29/2; 141/1.1; 141/32; 141/33
(58) Field of Search ................ 29/2; 429/212, 429/215, 217, 227, 233, 236, 239, 245; 141/1.1, 32, 33

(56) References Cited

U.S. PATENT DOCUMENTS

| | | | | | |
|---|---|---|---|---|---|
| 4,687,598 A | * | 8/1987 | Varma | ..................... | 252/519.33 |
| 4,939,050 A | * | 7/1990 | Toyosawa et al. | ........... | 429/241 |
| 4,948,685 A | * | 8/1990 | Ohsawa et al. | .............. | 429/213 |
| 5,643,665 A | * | 7/1997 | Saidi | ........................... | 428/330 |
| 5,871,862 A | * | 2/1999 | Olson | .......................... | 429/217 |

FOREIGN PATENT DOCUMENTS

EP   1261049 A1 * 11/2002   ............ H01M/4/14

OTHER PUBLICATIONS

Database WPI, Section Ch, Week 199442, Derwent Publications Ltd., London, GB; AN 1994–339926; XP002212388 & SU 1 820 963 A; Jun. 7, 1993 *abstract*.*
Patent Abstracts of Japan, vol. 2000, No. 06, Sep. 22, 2000 & JP 2000 067918 A Mar. 3, 2000; *abstract*.*
Patent Abstracts of Japan, vol. 018, No. 324 (E–1564), Jun. 20, 1994 & JP 06 076821 A Mar. 18, 1994, *abstract*.*
Patent Abstracts of Japan, vol. 013, No. 571 (E–862), Dec. 18, 1989 & JP 01 239764 A Sep. 25, 1989; *abstract*.*
Patent Abstracts of Japan, vol. 1997, No. 03, Mar. 31, 1997 & JP 08 293303 A, Nov. 5, 1996, *abstract*.*
Dmitrenko V E et al; "Influence of electrically conductive polymers on the operating parameters of lead/acid batteries", Journal of Power Sources, Elsevier Sequoia S.A. Lausanne, CH, vol. 67 NR. 1–2, pp. 111–113 XP004095170; ISSN; 0378–7753, 1997 (No Month).*

* cited by examiner

Primary Examiner—Patrick Ryan
Assistant Examiner—Tracy Dove
(74) Attorney, Agent, or Firm—Margaret A. Dobrowitsky

(57) ABSTRACT

A grid plate for high power lead acid battery having a plate (14) covered with a conductive polymeric matrix (10) of preferably polyaniline and its derivatives, which is then coated with nanoscale particles of active material (14) such as lead sulfate and basic lead sulfate complexes.

20 Claims, 1 Drawing Sheet

ACTIVE MATERIAL FOR HIGH POWER AND HIGH ENERGY LEAD ACID BATTERIES AND METHOD OF MANUFACTURE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to electrical energy storage devices, and more particularly to a high power liquid electrolyte battery providing electrodes with large reaction surface areas, a long cycling life and a production method for active materials using conductive polymeric matrixes.

2. Description of the Background Art

A lead-acid storage battery remains the battery of choice for traditional uses such as starting an automobile, providing emergency lighting, power for an electric vehicle or as a storage buffer for a solar-electric system. Such batteries may be charged, periodically, by a generator driven by an engine or by some other source of electrical energy. The electrical production and cycling demands that are placed on modern automotive batteries in particular are greater than ever before. These demands, among other factors, result in a reduction in the service life of the battery.

Lead-acid batteries typically comprise a series of cells consisting essentially of a positive plate containing lead or lead oxide and a negative plate made of a material such as sponge lead. The positive and negative plates of each cell are oriented vertically, connected in parallel and submerged in an electrolyte solution such as dilute sulfuric acid.

Perhaps the most common type of positive plate found in current lead-acid batteries is the pasted plate. During manufacture of the pasted plate type grid plate, lead oxide powder is mixed with water and sulfuric acid to form a basic sulfate complex, which is shaped into a plate. A porous interconnected structure is produced from the basic sulfate complexes during the steaming, curing and drying of the plates. The building blocks of the skeleton are basic sulfate crystals of approximately 20 $\mu$m to 50 $\mu$m in width and 100 $\mu$m in length. The skeleton provides an electrical conducting matrix including voids and channels for acid diffusion and provides an active surface for chemical and/or electrochemical reactions.

The morphology of the active material in green plates has been found to be an essential factor in the overall performance and service life of the battery. It is critical to create and maintain a strong and stable porous interlocked skeletal structure in the plates to achieve good performance and service life in the battery. For example, battery plates made up of tetra-basic sulfate crystals that have a high paste density with low porosity will result in a plate that has a long cycling life but low active material utilization in electrical performance.

In contrast, battery plates manufactured from low density paste with small sulfate crystals will allow a larger active material utilization but reduced cycling life due to reduced physical contact between active material crystals.

After the green plates are processed and assembled into a battery, sulfuric acid is added to the battery to react chemically with the paste materials to form lead sulfate, ($PbSO_4$). This process is called pickling or sulfation. The pickling reaction typically includes the conversion of the PbO component in free oxides (PbO) and basic lead sulfate complexes ($PbO \cdot PbSO_4$, monobasic lead sulfate; $3PbO \cdot PbSO_4 \cdot H_2O$, tribasic lead sulfate; $4PbO \cdot PbSO_4 \cdot H_2O$, tetrabasic lead sulfate) to $PbSO_4$ as follows:

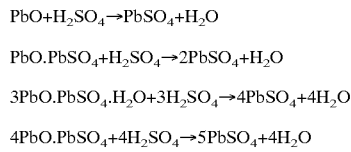

After the pickling step, $PbSO_4$ is electrochemically converted to lead dioxide ($PbO_2$) in the positive plate and sponge lead (Pb) in the negative plate formation process. The morphology of the formed active material depends on the original plate microstructure and the formation conditions (e.g. Input current, filling acid concentration, formation temperature and formation time). The mass-transfer behavior of the electrolytic species ($H^+$, $H_2SO_4$, and $H_2O$), to and from the surface of the active materials is another essential factor that controls the power and energy capabilities of a battery. The mass-transfer rate is affected by the macro and micro-porosity in the paste, the plate thickness, acid concentration and application conditions.

During the formation and application cycles of lead-acid batteries, a layer of oxide, approximately 0.001 inches to approximately 0.030 inches thick, is typically formed on the surface of the positive grid due to corrosion. The composition of the corrosion layer is responsible for electrical conductivity. The positive polarization oxidation of the lead (Pb) grid in sulfuric electrolyte solution produces a corrosion product consisting primarily of $PbO_2$ and far lesser amounts of PbO and $PbO_x$. The corrosion layer is typically composed of a matrix of lead (IV) ions ($Pb^{+4}$), and oxygen ions ($O^{-2}$).

During discharge, the positive active material $PbO_2$ is converted to $PbSO_4$, which is an electronic insulator. Thus, the grid is thermodynamically unstable and alternatively forms $PbO_2$ on the surface of the grid during charging and $PbSO_4$ during discharge.

In addition to the formation of $PbSO_4$ during discharge, the volume of the active material changes which is detrimental to the structural integrity of the positive and negative electrodes. For example, an increase of as much as 200% in the volume of the positive active materials and 260% in the negative active materials has been observed during discharge. Decreases in volume have also been observed during the charging cycle. Consequently, the repetitive expansion and contraction of the active materials often leads to the loss of crystal linkages in the skeletons eventually causing failure in the battery.

Another consequence of changes in volume in the active material is the loss of adhesion of the corrosion layer with the grid leading to the shedding of active materials that accumulate in the bottom of the battery casing. Over time the collected materials may accumulate on the bottom of the battery to a depth that allows a short circuit resulting in a dead cell and loss of battery life.

The aforementioned problems are accentuated in battery designs utilizing very thin plates to reduce the overall weight of the battery for use in aircraft and electric cars and the like. While thinner lightweight plates reduce the weight of the battery, the structure of the cell plates may not be sufficiently strong to prevent structural failure during the normal use of the battery.

Therefore, a need exists for a lead-acid battery that will maintain strong and stable skeletal structures during multiple charging cycles, provide a high reaction surface area as well as increased electronic conductivity of the active materials that can be easily and inexpensively fabricated. The present invention satisfies those needs, as well as others, and overcomes the deficiencies of previous battery designs.

BRIEF SUMMARY OF THE INVENTION

The present invention provides a battery plate and a method of manufacturing a battery plate with a surface that has very fine crystals in the order of approximately 100 nm to approximately 1 μm deposited within a conductive polymeric skeleton or matrix. The active polymeric skeleton can provide such critical functions as an electron and ion conductor, voids and channels for acid electrolyte diffusion and a structural support for active nanoscale crystals of $PbSO_4$ or basic lead sulfate complex. The conductive polymeric skeleton can also provide a very high surface area for the chemical and electrochemical reactions that take place during charge and discharge. The skeletal structure also allows a substantial increase in the utilization of the active material over the prior art while reducing the weight of the plate. In addition, the positive grid oxidization should be minimized due to the presence of the polymer film on the grid surface.

According to an aspect of the invention, a layer of conductive polymer is polymerized on the surface of a battery plate that is preferably cross-linked and highly conjugated in structure. The conductive polymers are preferably selected from the family of polyaniline compounds (PAN) and their derivatives. Polyaniline is a preferred polymer because it is electroactive in acidic media and is stable in sulfuric acid solutions over a wide range of applied potentials. The preferred form of PAN is sulfonated.

The active materials can be applied to a variety of cell designs including bipolar configuration, flat plates, spiral wounds or thin films. Depending on the application requirements, the electrodes can be produced in many different shapes and thicknesses.

An object of the invention is to provide lead acid battery plates that have a high percentage utilization of grid active material while maintaining strong skeletal structures in the plate.

Another object of the invention is to provide a lead acid battery that can be deeply discharged and have a long cycling capability.

Yet another object of the invention is to provide a battery plate that has conductive polymers on the surface that minimize positive grid oxidation and have a high reaction surface area.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings that are for illustrative purposes only.

DETAILED DESCRIPTION OF THE INVENTION

Figure 1:
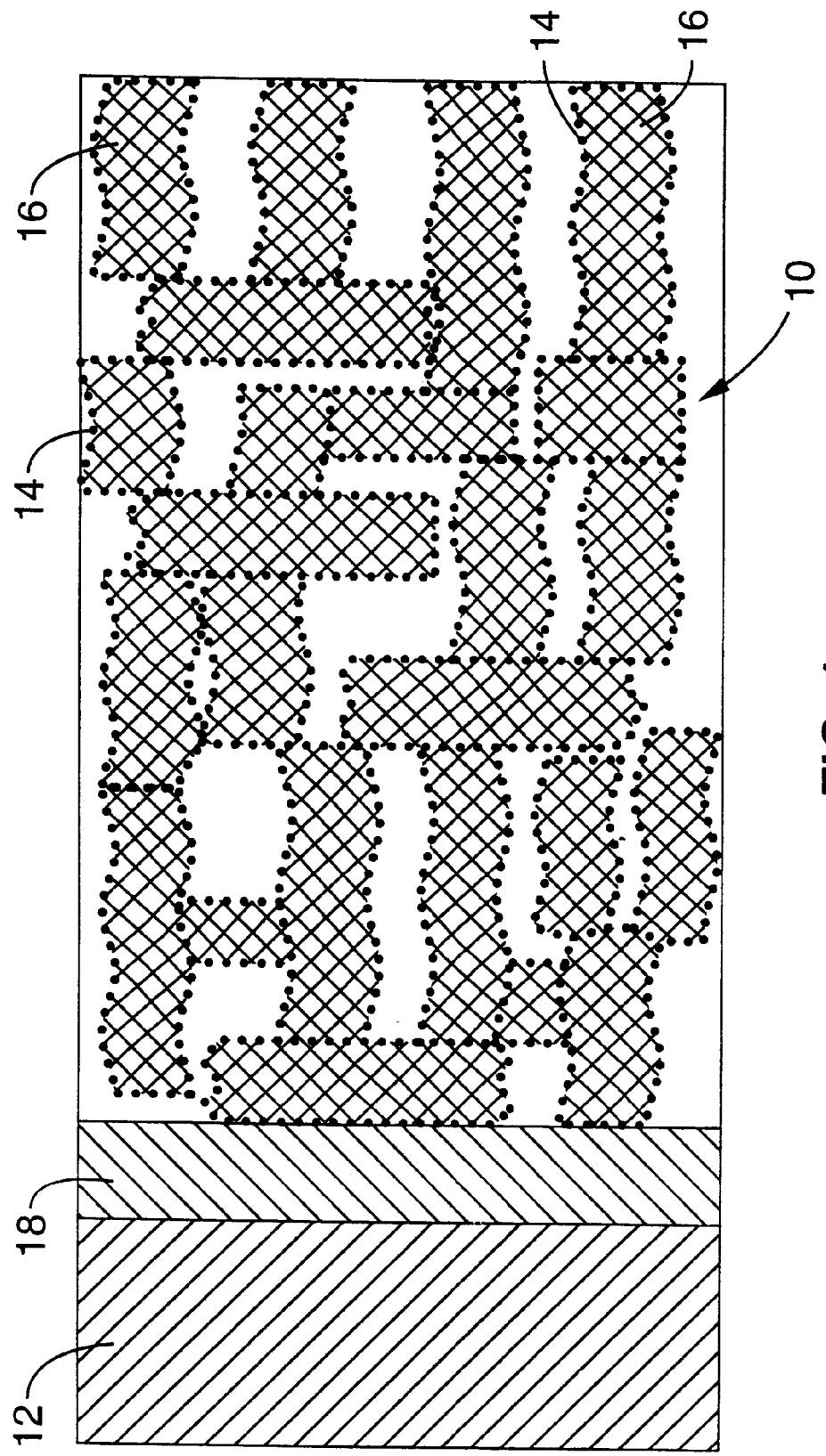
FIG. 1 is a representation of a lead metal positive terminal and the lead oxide corrosion layer that forms on the surface of metal grid plate and a conductive polymer skeleton according to the present invention.

Referring more specifically to the drawings, for illustrative purposes the present invention is embodied in the apparatus generally shown in FIG. 1. It will be appreciated that the Invention may vary as to configuration and as to details of the parts without departing from the basic inventive concepts disclosed herein.

Referring first to FIG. 1, the surface of a lead metal grid plate 12 is covered with a conductive polymer skeleton 10, preferably selected from the family of polyaniline and its derivatives, according to the present invention. Lead grid plate 12 is preferably made from lead metal or a lead metal alloy including thin metal foil combinations. Such alloys may include such metals as Antimony (Sb) and Tin (Sn) or like metals known in the art.

The polymer skeleton 10 is a cross-linked, highly conjugated structure that functions as an electron and ion conductor as well as a carrier for nanoscale crystals of $PbSO_4$ or basic lead sulfate complex 14. Polyaniline and its derivatives (PAN) are electroactive and stable in sulfuric acid over a wide range of applied potentials. The preferred form of PAN is sulfonated and has an electroconductivity comparable to that of metals. Other electroconductive polymers include polypyrrole, polythiophene, polyacetylene, poly phenylene-vinylene, poly thienylene-vinylene and polytriphenylamine.

The polymer skeleton 10 is covered with nanoscale crystals 14 which are approximately $1/100^{th}$ to approximately $1/1000^{th}$ the size of conventional active material particles. The use of nanoscale crystals will result in a dramatic increase in the effective reaction area and thus promote significant improvement in active material utilization.

Unlike the active materials used in conventional lead acid batteries, the active materials of the present invention have a high reaction surface area and maintains its structure by bonding with polymer chains 16 in the skeletal structure 10. The polymer skeleton 10 also provides a rigid and chemically stable porous structure to promote the diffusion of acid and ionic species, as well as provide electronic and ionic conductive networks to carry electrons for electrochemical reactions. With current batteries, the maximum utilization coefficient for the positive active materials where $PbO_2$ is converted to $PbSO_4$ is about 55 percent. Similarly, the maximum utilization coefficient at the negative active materials where Pb is converted to $PbSO_4$ is about sixty percent. Low active material utilization in prior art lead acid batteries is inevitable due to the fact that $PbSO_4$ is an electronic insulator. Thus, as the active material in both electrodes is converted to supply electricity to an external circuit, the conductivity within the battery decreases and eventually the battery will lose conductivity. In order to increase active material utilization, it is necessary to create an alternative path for electrical conduction and electron transfers while promoting efficient electrochemical activities.

The nanoscale $PbSO_4$ crystals 14 are bonded to the sulfonated PAN chains 16 of skeleton 10 as a result of the electrostatic attraction between the sulfate ion and the cationic radical nitrogen atoms or amine hydrogen. Nanoscale particles are superfine particles having a diameter within the range of approximately 1 to approximately 1000 nanometers. Aggregation of $PbSO_4$ crystals is also avoided due to the electrostatic repulsion between the $SO_3H$ groups in the sulfonated PAN chains 16 and the sulfate group in $PbSO_4$ as well as the spatial restrictions within large polymer chains 16.

Ionic polarization due to the electrical current is also minimized because the polymer skeleton 10 provides an alternative path for the transfer of electrons or charges. For example, the measured voltage during a constant current discharge process is expected to maintain fairly constant regardless of the amount of active material that is removed.

Batteries constructed according to the presented invention are also expected to have an extended service life. During discharge and charge cycling, the polymer chains will act as a "spring" to connect the active material particles. The changes in volume of the active material particles 14 that occur during charging or discharging of the battery will be effectively compensated for by the compression or stretching of the polymeric chains 16 of the skeleton 10. Thus, the degradation of the active materials is minimized.

Additionally, temperature has an insignificant effect on the electronic conductivity of polymer skeleton 10 during use. Therefore, an electrochemical battery using the polymer skeleton 10 of the present invention would be expected to have good power production and energy capabilities during cold weather as well as hot weather.

The presence of a polymeric skeleton 10 on the surface of the grid plate or lead metal component 12 will also result in the reduction of positive grid oxidation. Grid oxidation reduces the service life of the battery. The anodic oxidation of lead (Pb) in acid solutions produces a corrosion product consisting mainly of lead dioxide ($PbO_2$) and small amounts of (PbO) and ($PbO_x$). The corrosion layer 18 is typically composed of a matrix or lattice of lead (IV) ions ($Pb^{+4}$), and oxygen ions ($O^{-2}$).

A simplified view of the corrosion of lead metal under anodic polarization can be shown as follows:

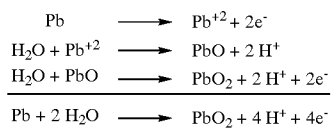

Oxygen ions ($O^{-2}$) are believed to move through the oxide lattice 14 from the electrolyte 12 by a vacancy mechanism. Oxygen ($O^{-2}$) ions move within the lattice from one position to another when a vacancy in the lattice becomes available. The jump from one position to another creates a new vacancy allowing adjacent oxygen atoms to jump to fill the new vacancy. The loosely bound symmetric structure of the lattice results in high electronic conductivity ($e^-$ or $H^+$) as well as high ionic conductivity ($O^{-2}$) Consequently, corrosion or oxidation of the lead metal components occurs beneath the $PbO_2$ corrosion layer 18 with the free movement of oxygen ions from the electrolyte through the corrosion layer 18. Thus, the $PbO_2$ corrosion layer 18 provides very little protection to the underlying lead 12 in the anodic environment of the battery.

According to the present invention, the skeletal structure of conductive polymer 10 on the grid surface 12 greatly reduces the corrosion of lead metal components by limiting the movement of oxygen ions through the lattice of the grid.

The conductive polymer skeleton 10 can be polymerized on the surface of battery grids by any number of procedures known in the art. After the base skeleton 10 is polymerized, the skeleton structures 16 are covered with nanoscale active particles by dipping, coating, spraying or the like. Compared to traditional battery manufacturing, the production process is simplified because the curing step in the conventional battery process can be eliminated. Additionally, the filling and formation efficiency can be improved and controlled by optimizing the microstructure of the polymeric skeletons 10.

The inventive concept can be applied to a variety of battery cell designs including bipolar configurations, flat plates, spiral wounds or thin films. The battery grids or current collectors 12 can be produced in varying thicknesses and different shapes depending on the battery requirements. For example the bipolar design is recommended for high-power and high-energy applications. The high active material utilization and the low electrical resistance will also allow battery designs with comparatively thick electrodes. Likewise, smaller batteries with fewer plates and reduced weight can be designed due to the high active material utilization.

Accordingly, it will be seen that this invention provides a simple and effective way of providing a battery where fast electrochemical reactions in both high rate and low rate discharge at a wide range of temperatures can be achieved. Minimal degradation of the structure and conductivity of the active materials will occur so that the batteries can be discharged deeper and have a longer cycling capability. Positive grid oxidation will also be minimized due to the protection provided by the polymer skeleton on the grid surface.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A liquid electrolyte battery electrode, comprising:
   (a) a battery grid plate (12) having at least one surface;
   (b) a conductive polymeric matrix (10) formed over said surface of said battery grid plate; and over the polymeric matrix,
   (c) a plurality of superfine particles of active material (14) coupled with said conductive polymeric matrix (10).

2. A battery electrode as recited in claim 1, wherein said battery grid plate (12) is made from lead metal.

3. A battery electrode as recited in claim 1, wherein said battery grid plate (12) is made from an alloy of lead.

4. A battery electrode as recited in claim 1, wherein said polymeric matrix (10) is polymerized from polyaniline.

5. A battery electrode as recited in claim 4, wherein said polyaniline forming said polymeric matrix (10) is sulfonated.

6. A battery electrode as recited in claim 1, wherein said polymeric matrix (10) comprises a polymer selected from the group of polymers consisting essentially of poly phenylene-vinylene, polypyrrole, poly thienylene-vinylene, polythiophene, polyacetylene and polytriphenylamine.

7. A battery electrode as recited in claim 1, wherein said active material (14) comprises nanoscale crystals of basic lead sulfate complex.

8. A battery electrode as recited in claim 1, wherein said active material (14) comprises nanoscale crystals of $PbSO_4$.

9. A battery electrode as recited in claim 1, wherein said nanoscale particles of active material (14) have an average diameter within the range of approximately 100 nm to approximately 1 $\mu$m.

10. A battery electrode as recited in claim 1, wherein said nanoscale particles of active material (14) have an average diameter within the range of approximately 5 nm to approximately 100 nm.

11. A method for producing a battery plate for a lead acid battery, comprising:
  (a) providing a formed battery grid (12) having at least one surface;
  (b) forming a conductive polymeric matrix (10) over said surface of said battery grid; and
  (c) coating said conductive polymeric matrix (10) with a plurality of nanoscale particles of active material (14) on said surface of said battery grid.

12. A method for producing a battery plate as recited in claim 11, wherein said active material (14) comprises nanoscale crystals of basic lead sulfate complex.

13. A method for producing a battery plate as recited in claim 11, wherein said active material (14) comprises nanoscale crystals of $PbSO_4$.

14. A method for producing a battery plate as recited in claim 11, wherein said nanoscale particles of active material (14) have an average diameter within the range of approximately 100 nm to approximately 1 $\mu$m.

15. A method for producing a battery plate as recited in claim 11, wherein said nanoscale particles of active material (14) have an average diameter within the range of approximately 5 nm to approximately 100 nm.

16. A method for producing a battery plate as recited in claim 11, wherein said battery grid (12) is made from lead metal.

17. A method for producing a battery plate as recited in claim 11, wherein said battery grid plate (12) is made from an alloy of lead.

18. A method for producing a battery plate as recited in claim 11, wherein said polymeric matrix (10) is polymerized from polyaniline.

19. A method for producing a battery plate recited in claim 18, wherein said polyaniline forming said polymeric matrix (10) is sulfonated.

20. A method for producing a battery plate as recited in claim 11, wherein said polymeric matrix (10) comprises a polymer selected from the group of polymers consisting essentially of poly phenylene-vinylene, polypyrrole, poly thienylene-vinylene, polythiophene, polyacetylene and polytriphenylamine.

* * * * *